US010602010B2

(12) United States Patent
Koseki

(10) Patent No.: US 10,602,010 B2
(45) Date of Patent: Mar. 24, 2020

(54) IMAGE FORMING APPARATUS

(71) Applicant: CANON KABUSHIKI KAISHA, Tokyo (JP)

(72) Inventor: Hiromichi Koseki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/028,660

(22) Filed: Jul. 6, 2018

(65) Prior Publication Data
US 2019/0014224 A1 Jan. 10, 2019

(30) Foreign Application Priority Data

Jul. 7, 2017 (JP) .................................. 2017-133802

(51) Int. Cl.
H04N 1/00 (2006.01)

(52) U.S. Cl.
CPC ....... *H04N 1/0083* (2013.01); *H04N 1/00328* (2013.01); *H04N 1/00535* (2013.01); *H04N 1/00557* (2013.01)

(58) Field of Classification Search
CPC ............. H04N 1/0083; H04N 1/00328; H04N 1/00535; H04N 1/00557
See application file for complete search history.

(56) References Cited

U.S. PATENT DOCUMENTS

2006/0033775 A1* 2/2006 Tsai ......................... B41J 19/00
347/50
2011/0235140 A1* 9/2011 Ito ......................... G03G 15/605
358/498
2016/0295058 A1* 10/2016 Yoshihara .......... H04N 1/00994
2017/0343952 A1 11/2017 Tokumoto et al.

FOREIGN PATENT DOCUMENTS

JP 2013235109 A 11/2013

* cited by examiner

*Primary Examiner* — Iriana Cruz
(74) *Attorney, Agent, or Firm* — Venable LLP

(57) ABSTRACT

An image forming apparatus, including: a circuit board on which an electronic part and a connector are mounted; a housing to which the circuit board is attached; a flexible flat cable, having a connecting portion connected to the connector, configured to electrically connect the circuit board and another circuit board different from the circuit board provided in the image forming apparatus; and a holding member holding the flexible flat cable and rotatable integrally with the flexible flat cable with respect to the housing, wherein the holding member is rotatable with respect to the housing between a first position in which the connecting portion is connected to the connector and a second position in which the connecting portion is retracted from a fitting position of the circuit board in the housing in a state in which the connecting portion is removed from the connector.

10 Claims, 11 Drawing Sheets

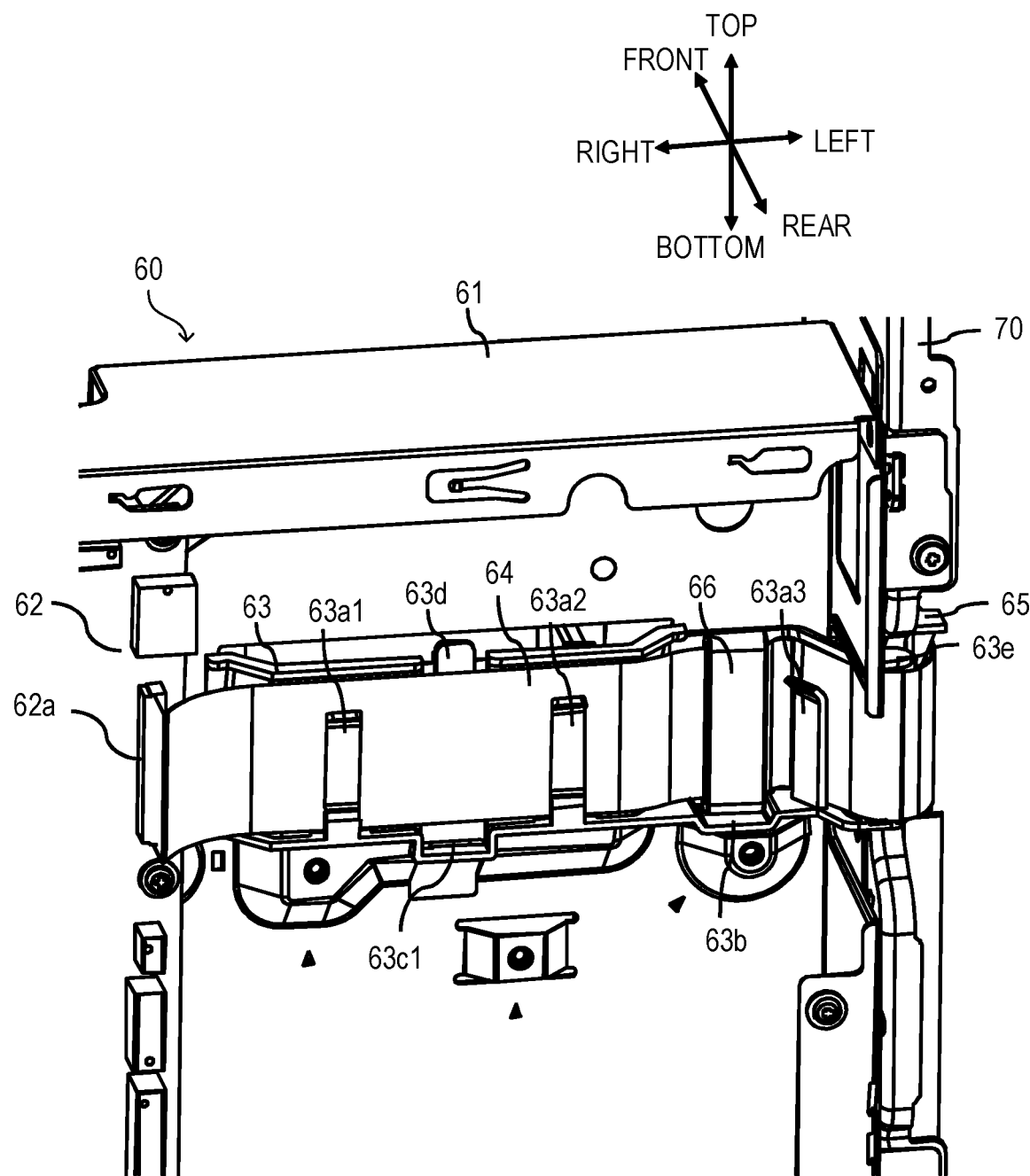

IMAGE FORMING APPARATUS

BACKGROUND OF THE INVENTION

Field of the Invention

The present invention relates to an image forming apparatus having a constitution to hold a flexible flat cable.

Description of the Related Art

Conventionally, as the cable guide for a flat cable, the following constitution has been proposed. For example, the height of the cable is regulated by a regulating portion, and the cable is guided to the height of a flat portion by an inclined portion, between the regulating portion and a connector. It is proposed to match positions of a cable end portion and the connector with each other easily by guiding the cable to a fixed height by the flat portion, and insert the cable end portion into the connector smoothly (Japanese Patent Application Laid-Open No. 2013-235109).

In recent years, during work such as maintenance or the like, a controller circuit board to which a flat cable has been connected is detached from a housing of an image forming apparatus, and the flat cable which is connected to the controller circuit board has been left at a housing side. At this time, the flat cable is located in a vicinity of a fitting position of the controller circuit board. Therefore, when the controller circuit board is fitted to the housing again, it is necessary to fit the controller circuit board to an attaching position in the state in which the flat cable is retracted from the fitting position of the controller circuit board, and thereafter connect the flat cable to the controller circuit board. In the case like this, a worker has to attach the controller circuit board to the housing with the flat cable held by his or her hand so as to retract the flat cable from the fitting position of the controller circuit board, so that workability at the time of fitting work of the controller circuit board is low.

SUMMARY OF THE INVENTION

The present invention is made under the situation like this, and has an object to restrain workability at a time of maintenance work and the like from being reduced.

In order to solve the aforementioned problem, an image forming apparatus according to one embodiment of the present invention comprises:

a circuit board on which an electronic part and a connector are mounted;

a housing to which the circuit board is attached;

a flexible flat cable having a connecting portion, which is connected to the connector, and configured to electrically connect the circuit board and another circuit board different from the circuit board provided in the image forming apparatus; and a holding member holding the flexible flat cable and configured to be rotatable integrally with the flexible flat cable with respect to the housing, wherein the holding member is held rotatably with respect to the housing so that the holding member is rotatable between a first position in which the connecting portion is connected to the connector and a second position in which the connecting portion is retracted from a fitting position of the circuit board in the housing in a state in which the connecting portion is removed from the connector.

Further features of the present invention will become apparent from the following description of exemplary embodiments with reference to the attached drawings.

BRIEF DESCRIPTION OF THE DRAWINGS

FIG. 3 is a perspective view illustrating a fitted state of a cable guide in embodiment 1.

DESCRIPTION OF THE EMBODIMENTS

Hereinafter, modes for carrying out the present invention will be described in detail with reference to the drawings based on embodiments.

Embodiment 1

[Image Forming Apparatus]

Figure 1:
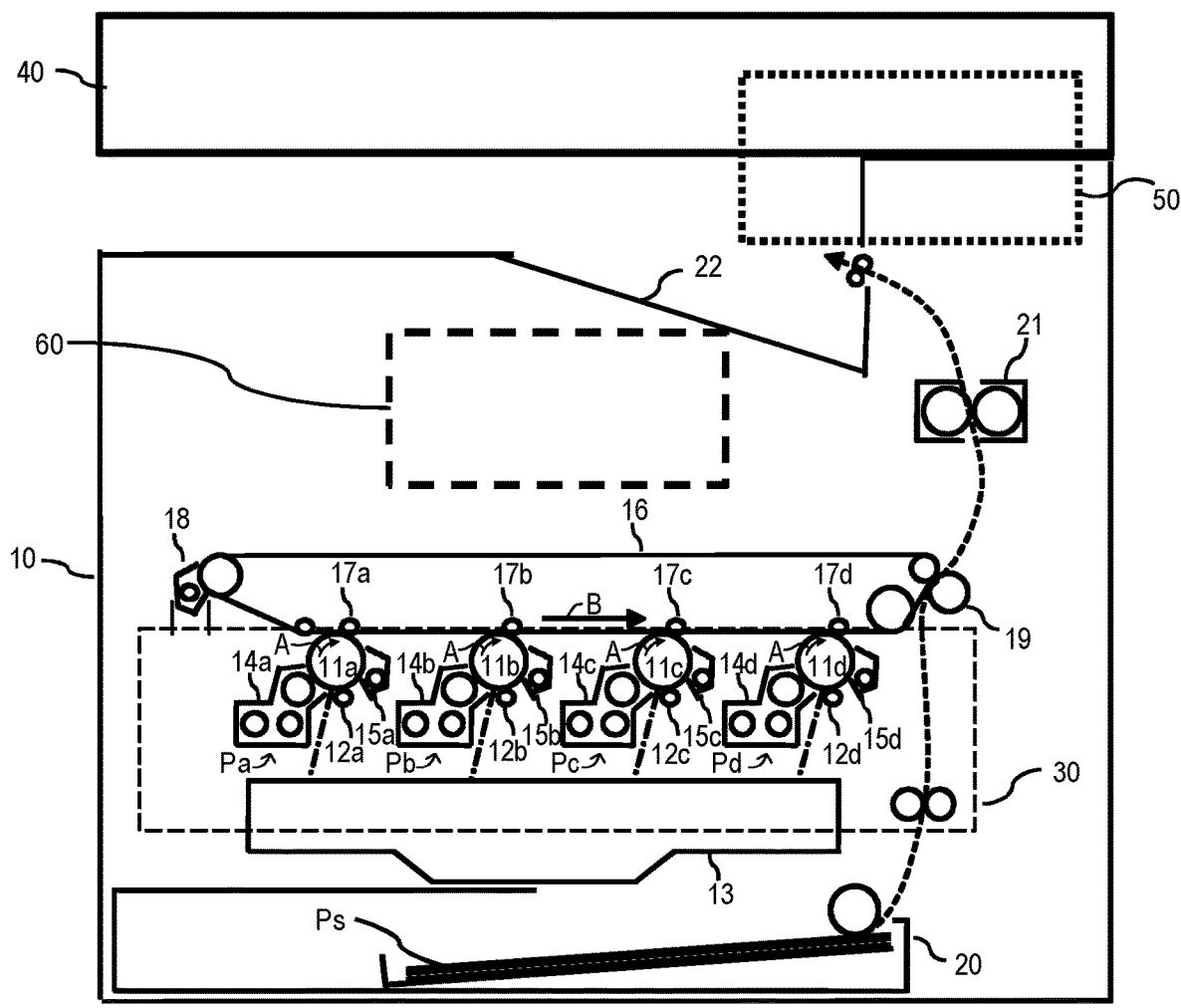
FIG. 1 is a view illustrating a constitution of an image forming apparatus of embodiments 1 and 2.

A cable guide in embodiment 1 and an image forming apparatus including the cable guide will be described. FIG. 1 is a sectional view describing an outline of a configuration of an image forming apparatus 10. Photosensitive drums 11a, 11b, 11c and 11d which are photosensitive members are photosensitive drums corresponding to four colors of yellow, magenta, cyan, and black respectively, and subscripts a, b, c and d denote yellow, magenta, cyan and black. Hereinafter, except for the case of describing a member in specific color, subscripts denoting colors will be omitted. Around the photosensitive drum 11, a charging device 12 which uniformly charges a surface of the photosensitive drum 11, and an exposure device 13 which emits laser beam which is modulated based on image information which should be formed on a charged surface of the photosensitive drum 11 are disposed. Further, around the photosensitive drum 11, a developing device 14 which develops a latent image formed on the surface of the photosensitive drum 11 by a laser beam emitted from the exposure device 13, and a drum cleaning device 15 which cleans and collects toner remaining on the surface of the photosensitive drum 11 are disposed. The photosensitive drum 11, the charging device 12, the developing device 14 and the drum cleaning device 15 are integrated for each color, and called a process unit P (Pa, Pb, Pc and Pd).

On upper portions of the photosensitive drums 11, an intermediate transfer belt 16 on which toner images on the photosensitive drums 11 are transferred is disposed, and in the intermediate transfer belt 16, primary transfer rollers 17 are disposed at positions facing the respective photosensitive drums 11. At a periphery of the intermediate transfer belt 16, a belt cleaning device 18 which collects toner remaining on a surface of the intermediate transfer belt 16 is disposed.

A secondary transfer roller 19 is disposed at a position facing the intermediate transfer belt 16, at an opposite side from the belt cleaning device 18, of the intermediate transfer belt 16. The secondary transfer roller 19 is adapted so that a recording medium Ps which is fed from a feeding device 20 is conveyed to a transfer position (hereinafter, referred to as a secondary transfer position) between the intermediate transfer belt 16 and the secondary transfer roller 19. At a downstream side in a conveying direction of the recording medium Ps which passes through the secondary transfer position, a fixing device 21 and a discharge tray 22 are disposed. An operation of the image forming apparatus 10 described above is controlled by a controller 60 illustrated by a thick broken line. The toner which is collected by the drum cleaning devices 15 and the belt cleaning device 18 is discharged to a collected toner box 30 illustrated by a thin broken line and disposed on a front surface of the image forming apparatus 10.

Next, an outline of the operation of the image forming apparatus 10 will be described. The photosensitive drum 11 rotates at a fixed speed in an arrow A direction (a clockwise direction) by a driving device (not shown). Onto the surface of the photosensitive drum 11 which is uniformly charged by the charging device 12, a laser beam which is modulated based on image information which should be formed is emitted from the exposure device 13, and a latent image is formed. The latent image on the photosensitive drum 11 is developed by toner which is charged inside the developing device 14, and a toner image is formed.

When the toner image on the photosensitive drum 11 reaches a position where the toner image is transferred onto the intermediate transfer belt 16 (hereinafter, referred to as a primary transfer position) by rotation in the arrow A direction of the photosensitive drum 11, the toner image on the photosensitive drum 11 is transferred onto the intermediate transfer belt 16 by an operation of the primary transfer roller 17. Toner on the photosensitive drum 11, which is not transferred onto the intermediate transfer belt 16 in the primary transfer position, is collected by the drum cleaning device 15, and the surface of the photosensitive drum 11 is cleaned and is prepared for next image formation. The collected toner is discharged to the collected toner box 30.

The intermediate transfer belt 16 rotates at a fixed speed in an arrow B direction (counterclockwise direction) by a driving device (not shown). In accordance with a timing when the toner on the intermediate transfer belt 16 is conveyed to the secondary transfer position by the rotation, the recording medium Ps is fed from the feeding device 20, and at the secondary transfer position, the toner image on the intermediate transfer belt 16 is transferred onto the recording medium Ps by an operation of the secondary transfer roller 19. The toner on the intermediate transfer belt 16 which is not transferred at the secondary transfer position is collected by the belt cleaning device 18, and the surface of the intermediate transfer belt 16 is cleaned and is prepared for next image formation. The collected toner is discharged to the collected toner box 30. In the recording medium Ps onto which the toner is transferred, an unfixed toner image on the recording medium Ps is subjected to fixing processing by the fixing device 21, and the recording medium Ps is discharged to the discharge tray 22.

An image scanner 40 which is a reading device is provided on an upper portion of the image forming apparatus 10. The image scanner 40 is disposed on a frame body 70 (FIG. 7) of the image forming apparatus 10. In the present embodiment, the image scanner 40 is an element which constitutes a part of the image forming apparatus 10. The image scanner 40 reads an image on an original, and outputs, for example, information on the read image to the controller 60 of the image forming apparatus 10. Further, an operation panel 50 illustrated by a dotted line is disposed in the image forming apparatus 10, and a user can operate the image forming apparatus 10 and the image scanner 40 by using the operation panel 50, and the user can know states of the image forming apparatus 10 and the image scanner 40 based on the displayed information.

Figure 2:
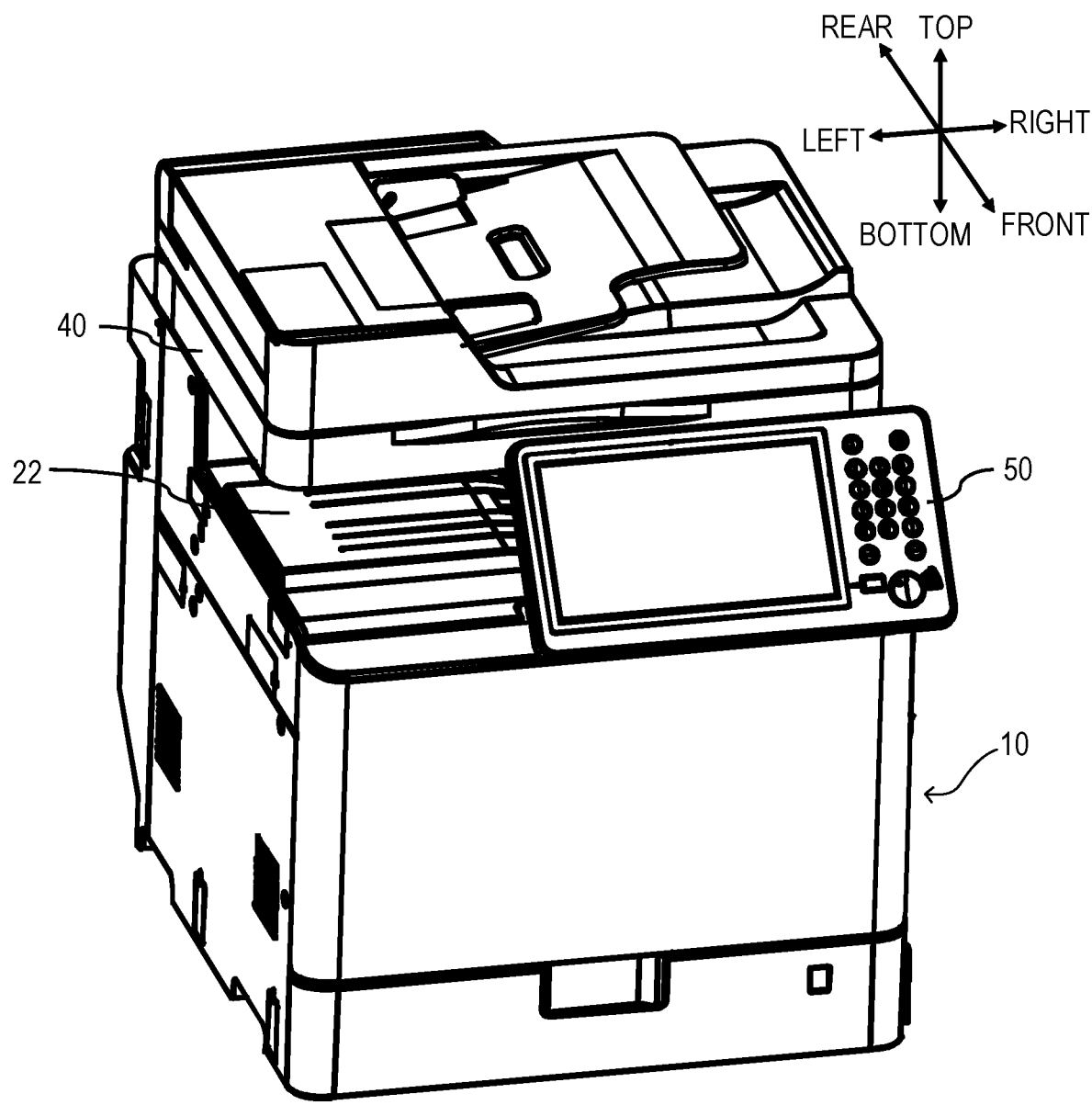
FIG. 2 is a general view of the image forming apparatus of embodiments 1 and 2.

FIG. 2 is an entire outside view of the image forming apparatus 10 of embodiment 1. A front surface (FRONT), a rear surface (REAR), right (RIGHT), left (LEFT), top (TOP) and bottom (BOTTOM) of the image forming apparatus 10 are as illustrated in FIG. 2. The user selects a function of the image forming apparatus 10 for use by using the operation panel 50 which is provided on a front surface side of the image forming apparatus 10. For example, when the user selects copy, a number of copies, enlargement/reduction, density, double-sided/single-sided, color/monochrome, selection of sizes of a cassette and sheet to be fed, presence or absence of aftertreatment such as staple and the like are selected. When the user selects these things, and a start button on the operation panel 50 is pressed down in a state in which an original to be a copy source is placed on the image scanner 40, the image of the original is read by the image scanner 40. Information on the image of the original which is read by the image scanner 40 is transmitted to the controller 60 and is converted into a signal for image formation, and the aforementioned image forming processing is performed.

Next, when a print job is selected and instructed, an external input from a personal computer or the like is directly input to the controller 60. Information on the image which is input to the controller 60 is converted into a signal for image formation, and the aforementioned image forming processing is performed. The recording medium Ps on which the image is formed is stacked on the discharge tray 22.

[Cable Guide]

Next, a cable guide in embodiment 1 will be described with use of FIG. 3. FIG. 3 is a perspective view of a first state in which a first flat cable 64 which electrically connects the exposure device 13 and the controller 60, and a first cable guide 63 which guides the first flat cable 64 are fitted to the controller 60. Here, the first flat cable 64 is an example of a flexible flat cable. FIG. 3 is drawn so that a rear surface side (REAR) of the image forming apparatus 10 is on the front. The controller 60 is disposed so that a worker who performs maintenance is accessible from the rear surface side of the image forming apparatus 10. That is, the controller 60 is provided at the rear surface side of the image forming apparatus 10. The controller 60 is formed of a shield case 61, a controller circuit board 62 stored inside the shield case 61, various electric wire bundles connected to the controller circuit board 62 and guide members of the electric wire bundles and the like. On the controller circuit board 62 (circuit board), various electronic parts and a connector 62a are mounted.

The controller 60 may be detached from the frame body 70, for example, when maintenance of the controller circuit board 62, and maintenance of components and the like inside (inside the housing) the frame body 70 covered with the shield case 61. Here, the components inside the frame body 70 which is covered with the shield case 61 are the driving portion, a high pressure circuit board and the like of the image forming apparatus 10, for example.

Figure 4A:
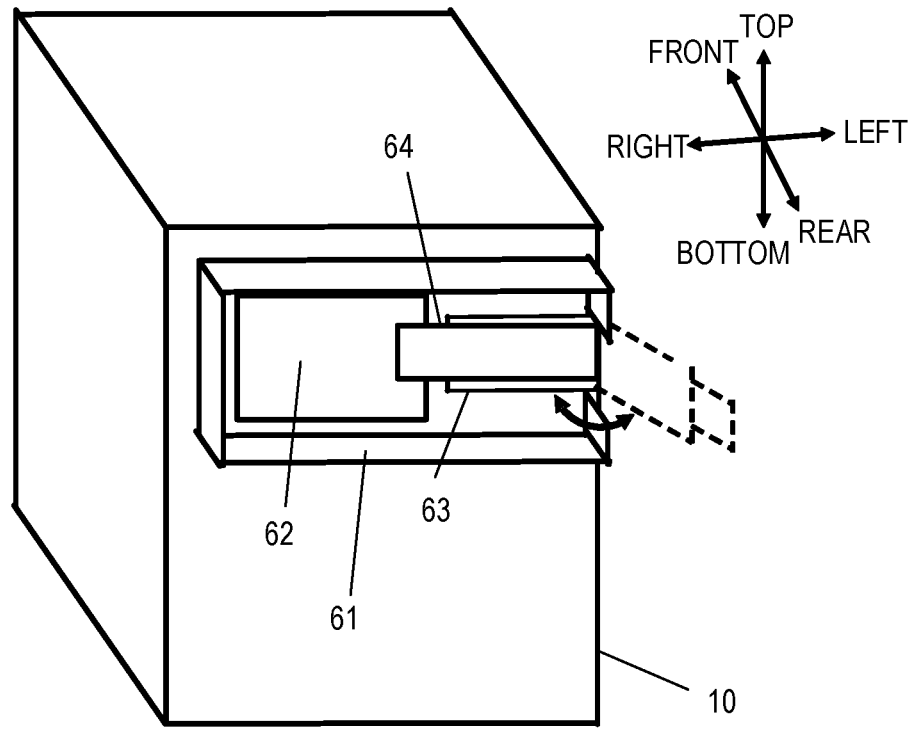
FIGS. 4A and 4B are views of the image forming apparatus in embodiments 1 and 2 from a rear surface side.
Figure 4B:
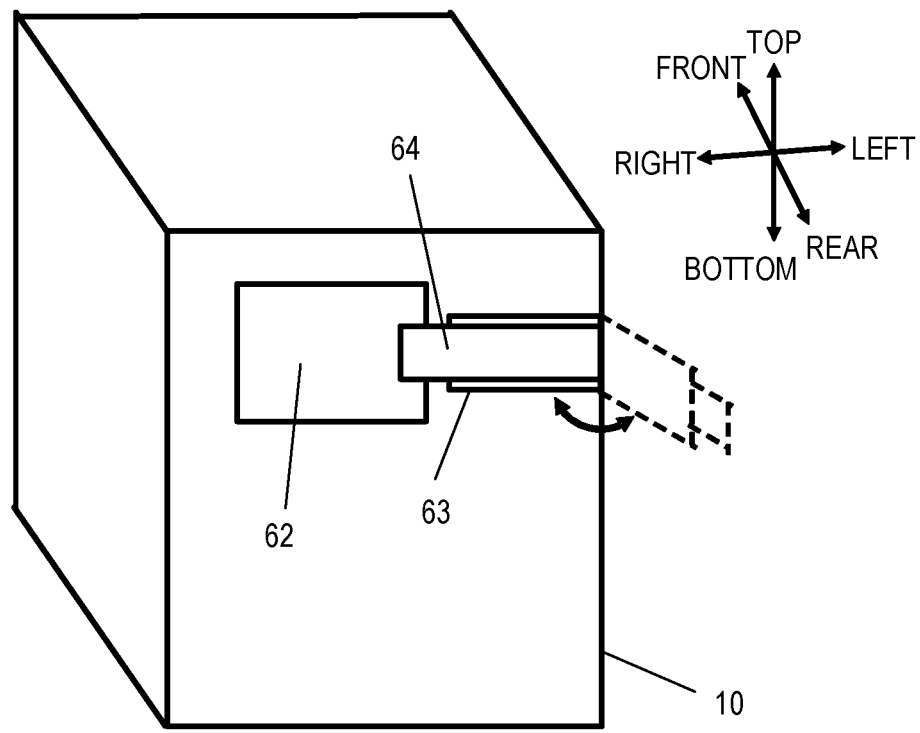

In the shield case 61, an opening at the rear surface side in the image forming apparatus 10 is shielded with a shield case lid (not shown) so that the shield case lid covers the controller circuit board 62. The shield case 61 is fitted to the frame body 70 which is the housing, and is located at the rear surface side of the image forming apparatus 10. Note that a constitution in which the controller circuit board 62 is disposed on a rear surface of the image forming apparatus 10 without providing the shield case 61 may be adopted. FIGS. 4A and 4B are views of the image forming apparatus 10 seen from the rear surface side. FIG. 4A is a view illustrating a case in which the shield case 61 is present, and FIG. 4B is a view illustrating a case in which the shield case is not present.

At a time of maintenance work of the controller circuit board 62 of the mode illustrated in FIG. 4A, the controller circuit board 62 is detached integrally with the shield case 61. Therefore, a fitting position of the controller circuit board 62 to the frame body 70 in the mode illustrated in FIG. 4A is the same as a fitting position of the shield case 61 to the frame body 70. At a time of maintenance work of the controller circuit board 62 in the mode illustrated in FIG. 4B, only the controller circuit board 62 is detached from the fitting position of the frame body 70.

The first cable guide 63 which is an example of the holding member is a guide which is disposed in the shield case 61 (in the shield case), out of guide members for the first flat cable 64 which electrically connects a circuit board (another circuit board provided in the image forming apparatus 10) which controls the exposure device 13, and the controller circuit board 62. A second cable guide 65 which is an example of a support member is a guide which is disposed in the frame body 70 outside the shield case 61. The second cable guide 65 regulates a position of the first flat cable 64 at a frame body 70 side (housing side). The first flat cable 64 which is connected to the circuit board of the exposure device 13 is guided by the second cable guide 65 and the first cable guide 63, and is connected to the connector 62a which is mounted on the controller circuit board 62 (on the circuit board).

The first flat cable 64 has a connecting portion at one end portion connected to the connector 62a, and a connecting portion at the other end portion connected to a connector on the circuit board of the exposure device 13, and thereby electrically connects the exposure device 13 and the controller circuit board 62. In the present embodiment, a position where the connecting portion of the first flat cable 64 connected to the exposure device 13 is connected to the connector 62a is set as a first position.

The first flat cable 64 on the first cable guide 63 is held by the first cable guide 63 so that lift from the first cable guide 63 is regulated by cable regulating members 63a1, 63a2 and 63a3. Further, in order to reduce noise generated in a signal on the first flat cable 64, the first flat cable 64 is passed through a ferrite core 66 which is a noise suppressing member at a rear side (an exposure device 13 side) of the connector 62a. The ferrite core 66 is held in a concavity 63a which is a holding shape portion provided on an undersurface side of the first cable guide 63. By the concavity 63b, movement of the ferrite core 66 in the lateral direction is regulated, and the ferrite core 66 is restrained from falling off from the first cable guide 63. In embodiment 1, the position of the ferrite core 66 is regulated by the concavity 63b, but the position of the ferrite core 66 can be regulated more firmly by a constitution in which a wall is also provided on the top surface side, and the ferrite core 66 is lightly press-fitted, a structure in which a retention claw or the like is provided and the like. The first cable guide 63 is fixed to the shield case 61 by hook shapes 63c1 and 63c2 (refer to FIG. 5) and a snap fit 63d.

That is, as illustrated in FIG. 4A, when the image forming apparatus 10 is seen from the rear surface in the state in which the connecting portion of the first flat cable 64 is connected to the connector 62a, at least a part of the first cable guide 63 is provided to overlap the shield case 61 in a front-rear direction (FRONT-REAR direction). The first cable guide 63 is disposed to overlap the shield case 61 in a plane direction of a mounting surface of the control circuit board 62. Therefore, on a side surface of the shield case 61, a recessed portion which allows rotation of the first cable guide 63 is formed so as not to inhibit rotation of the first cable guide 63 to the frame body 70.

Here, the shield case 61 is formed from a metal, and the first cable guide 63 and the second cable guide 65 are formed from a resin. As illustrated in FIG. 3, in the state in which the first flat cable 64 is connected to the connector 62a, the first cable guide 63 is interposed between the first flat cable 64 and the shield case 61. Thereby, noise which occurs to the signal on the first flat cable 64 by the first flat cable 64 being close to the shield case 61 made of a metal can be reduced.

Figure 5:
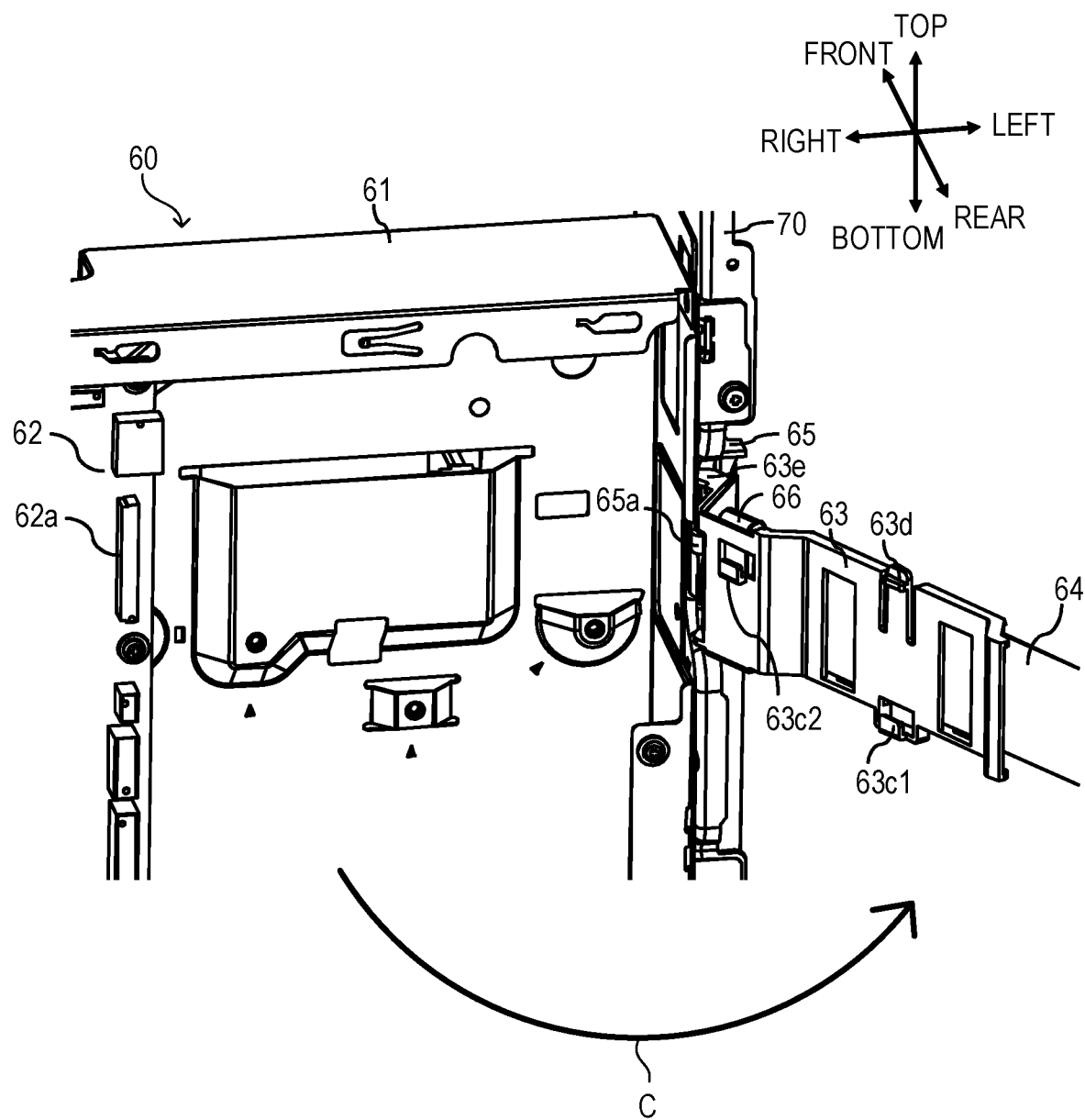
FIG. 5 is a perspective view illustrating a separating state of the cable guide in embodiment 1.
Figure 6A:
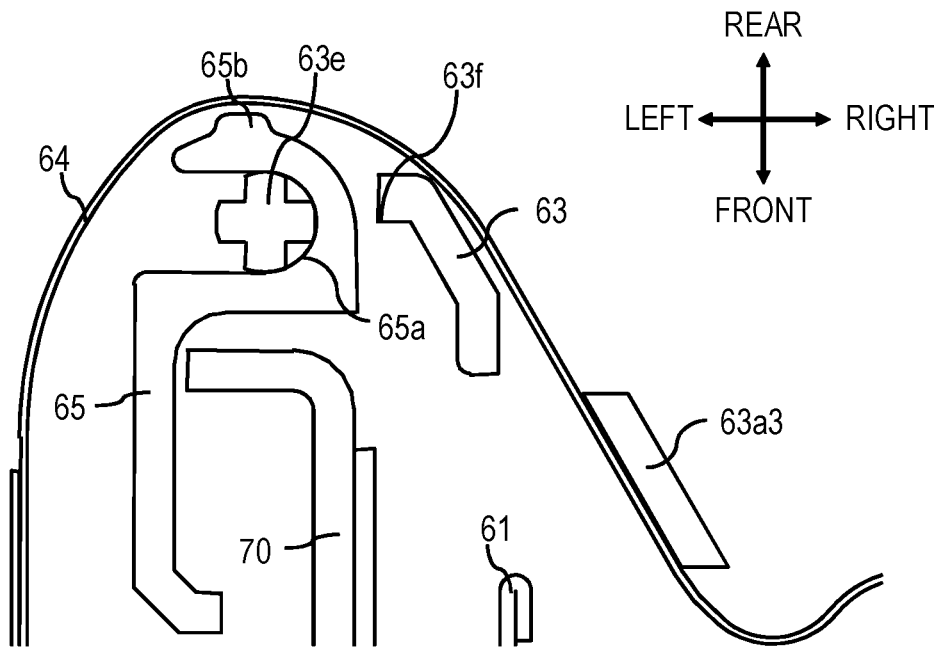
FIGS. 6A and 6B are sectional views illustrating a rotational portion of the cable guide in embodiment 1.
Figure 6B:
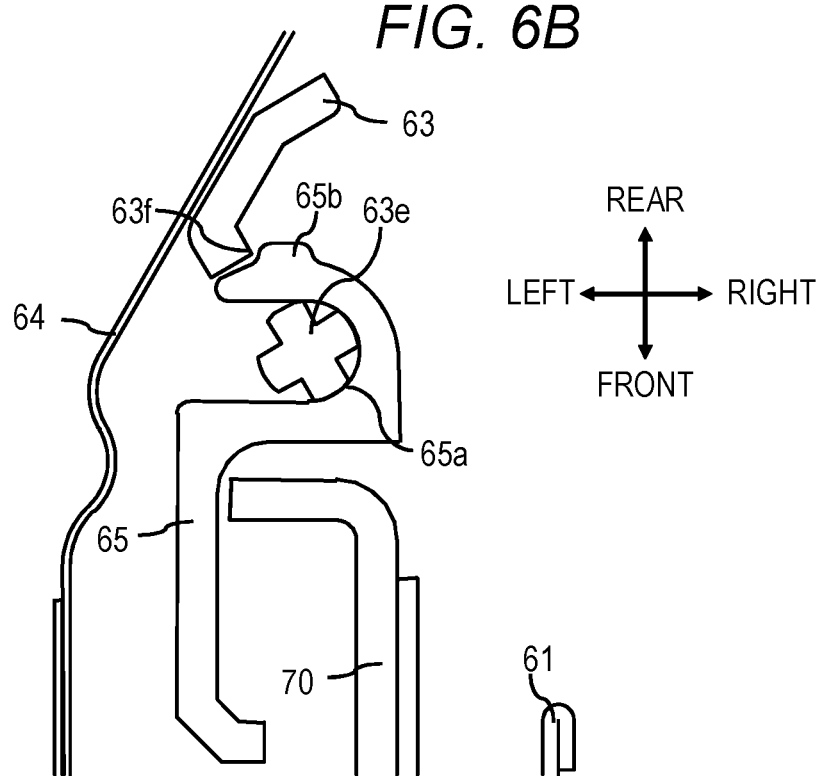

Next, a process of the first cable guide 63 rotating with respect to the frame body 70 and retracting from the controller 60 will be described with use of FIG. 5, and FIGS. 6A and 6B. FIG. 5 is a perspective view of a state where the first cable guide 63 is located in a second position at which the first cable guide 63 is retracted from the controller 60, FIGS. 6A and 6B are sectional views of a rotational shaft portion, FIG. 6A illustrates a state where the first cable guide 63 is located in the first position, and FIG. 6B illustrates a state where the first cable guide 63 is located in the second position. The first cable guide 63 is movable to the second position in FIG. 5 from the first position in FIG. 3 by rotating the first cable guide 63 as illustrated by an arrow C in FIG. 5. In FIG. 5, the rear surface side (REAR) of the image forming apparatus 10 is drawn to be on the front. The controller 60 is disposed at a position in which an access can be made from the rear surface side of the image forming apparatus 10 by detaching a rear surface cover (not shown) of the image forming apparatus 10.

A first shaft 63e provided at the first cable guide 63 is held rotatably by a second bearing 65a provided at the second cable guide 65. The first cable guide 63 with the first flat cable 64 removed from the connector 62a, and the snap fit 63d detached is movable between the first position and the second position by rotating around the first shaft 63e. The first cable guide 63 which rotates from the first position around the first shaft 63e reaches the second position illustrated in FIG. 5. At this time, the first flat cable 64 and the ferrite core 66 are in a state held by the first cable guide 63, and can retract from the controller 60 integrally with the first cable guide 63. Further, in the state in which the first cable guide 63 is located in the second position, the connecting portion which is connected to the connector 62a in the first flat cable 64 can be retracted from the fitting position of the controller 60 in the frame body 70. Further, the connecting portion which is connected to the connector 62a in the first flat cable 64 can be retraced from the fitting position of the controller circuit board 62 in the frame body 70. In the present embodiment, the position where the first cable guide 63 is retracted from the controller 60 in the state in which the other connecting portion of the first flat cable 64 having one connecting portion connected to the exposure device 13 is removed from the connector 62a, is set as the second position.

In the present embodiment, the constitution in which the first shaft 63e is provided at the first cable guide 63, and the second bearing 65a is provided at the second cable guide 65 is adopted, but a constitution in which the second bearing 65a is provided at the first cable guide 63, and the first shaft 63e is provided at the second cable guide 65 may be adopted.

The second cable guide 65 has an engaging portion 65b which engages with an engaged portion 63f to hold the first cable guide 63 in the second position when the first cable guide 63 rotates with respect to the second cable guide 65 and is located in the second position. As illustrated in FIGS. 6A and 6B, the engaged portion 63f is provided at the first cable guide 63, and the engaging portion 65b is provided at the second cable guide 65 respectively. The engaged portion 63f is one end portion of the first cable guide 63. Further, the first cable guide 63 is formed to be long in a direction in which a signal line of the first flat cable 64 which is held by the first cable guide 63 extends. The engaged portion 63f is provided at the end portion at an opposite side from the end portion provided with the connecting portion which connects the connector 62a of the first flat cable 64 in the first cable guide 63 in the longitudinal direction of the first cable guide 63. Further, the engaging portion 65b is a protrusion which is formed at the second cable guide 65. When the first cable guide 63 moves from the first position to the second position, the engaged portion 63f (one end portion) of the first cable guide 63 abuts on the engaging portion 65b (protrusion) of the second cable guide 65 and thereafter rides over the engaging portion 65b, and thereby the first cable guide 63 is held in the second position. The engaged portion 63f abuts on the engaging portion 65b and rides over the engaging portion 65b in a process of the first cable guide 63 moving from the first position (FIG. 6A) to the second position (FIG. 6B). In order that the first cable guide 63 returns to the first position from the second position, the engaged portion 63f needs to ride over the engaging portion 65b again, so that the first cable guide 63 can be kept in the second position as long as an intentional operation is not performed. That is, even if the worker releases his or her hands from the first cable guide 63 when attaching the controller 60, the state in which the first cable guide 63 is retracted from the fitting position of the controller 60 as illustrated in FIG. 5 is kept.

As above, in embodiment 1, the first cable guide 63 and the first flat cable 64 can be held in the state in which the first cable guide 63 and the first flat cable 64 are retracted with respect to the controller 60, that is, in the second position, so that the worker does not have to attach the controller 60 while holding the flat cable. Consequently, workability of the worker can be restrained from being reduced. Further, the constitution is adopted, in which the first cable guide 63 is rotatably held by the second cable guide 65 provided at the frame body 70, and the first flat cable 64 and the ferrite core 66 are held on the first cable guide 63. Thereby, the first flat cable 64 which is detached when the controller 60 is detached can be prevented from being folded by a self-weight of the first cable guide 63 and damaging the signal line. Further, by holding the first cable guide 63 in the second state, the first flat cable 64 can be retraced from the fitting position of the controller 60. Consequently, damage (flaw/breaking wire) of the first flat cable 64 can be prevented, which is caused by the first flat cable 64 being caught by the controller 60 and the frame body 70 (housing) of the image forming apparatus 10 unintentionally at the time of attaching the controller 60. Further, a similar effect can also be expected in a constitution in which the controller circuit board 62 is disposed on the rear surface of the image forming apparatus 10 without providing the shield case 61. For example, when the controller circuit board 62 is attached to the image forming apparatus 10, the first flat cable 64 can be retracted from the fitting position of the controller circuit board 62 according to the configuration of embodiment 1. Consequently, damage (flaw/breaking wire) of the first flat cable 64 can be prevented, which is caused by the connecting portion of the first flat cable 64 being caught by the controller circuit board 62 and the image forming apparatus 10. Note that the connecting portion of the first flat cable 64 especially refers to a terminal portion which is connected to a connector of the controller circuit board 62.

Note that in embodiment 1, a tandem type color electrophotography image forming apparatus is described, but the constitution of embodiment 1 is also applicable to image forming apparatuses of other types such as an electrophotography type, and an inkjet.

Further, in embodiment 1, the constitution is adopted, in which the second cable guide which holds the first flat cable 64 with the first cable guide 63 is provided at the frame body 70, but a constitution may be adopted, in which the first cable guide 63 includes a mechanism which rotatably holds the first flat cable 64 with respect to the frame body 70 without providing the second cable guide. For example, the first cable guide 63 may be adapted to be rotatably held with respect to the frame body 70 by adopting a constitution in which a bearing which rotatably holds the first shaft 63e is provided at the frame body 70.

Further, in embodiment 1, the constitution is disclosed, in which a substantially entire region of the first cable guide 63 is disposed at a position where the substantially entire region of the first cable guide 63 overlaps the shield case 61 as illustrated in FIG. 3, but a constitution in which at least a partial region of the first cable guide 63 overlaps the shield case 61 may be adopted. In this constitution, workability at the time of attaching and detaching the shield case 61 can be restrained from being reduced by applying the constitution in which the first cable guide 63 is made rotatable with respect to the frame body 70.

As above, according to embodiment 1, the flat cable can be prevented from being damaged without reducing workability at a time of assembly and at a time of maintenance work.

Embodiment 2

Figure 7:
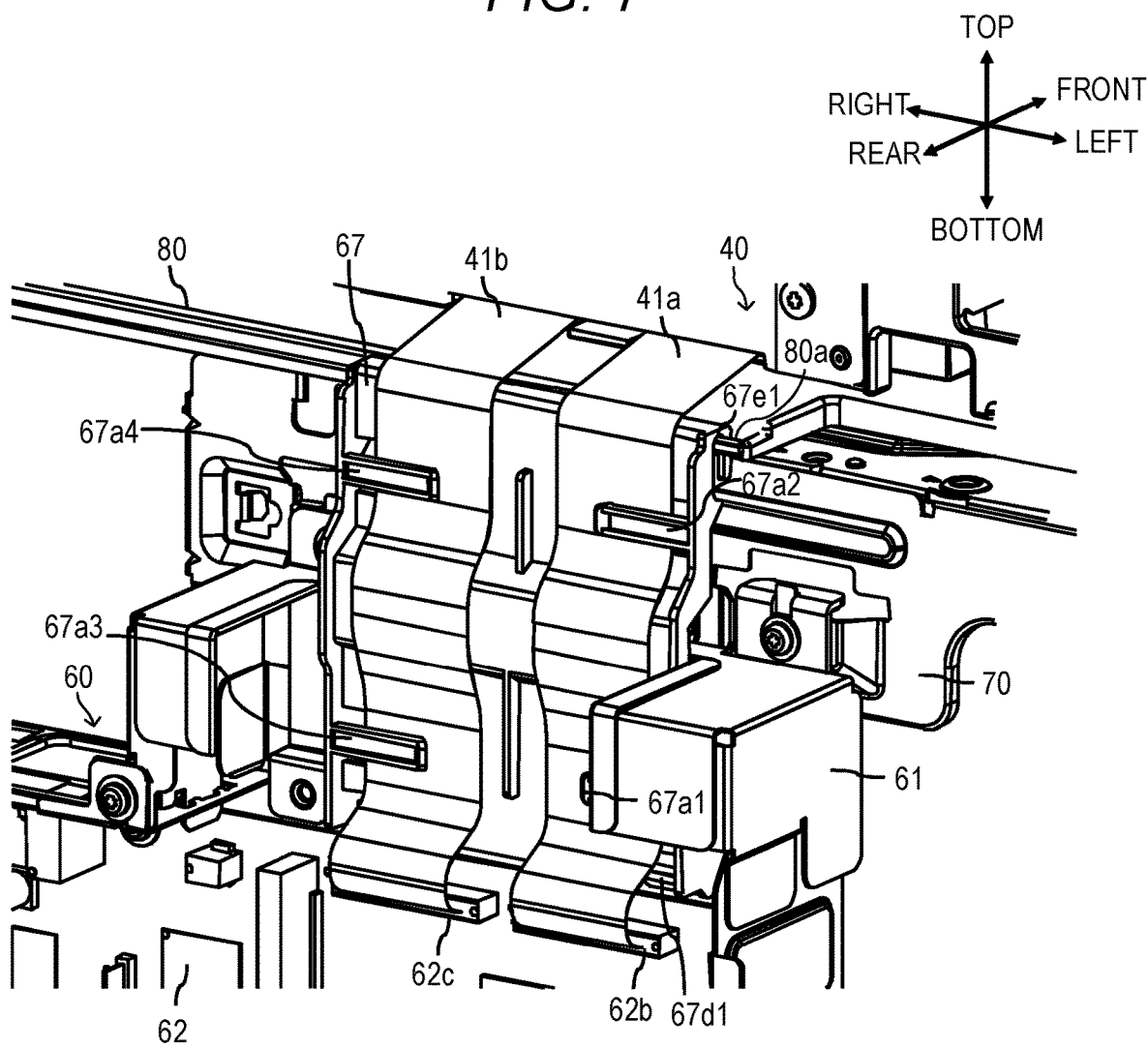
FIG. 7 is a perspective view illustrating a fitted state of a cable guide in embodiment 2.

A cable guide in embodiment 2 will be described with use of FIG. 7. FIG. 7 is a perspective view illustrating a first state. In FIG. 7, second flat cables 41a and 41b which electrically connect the image scanner 40 and the controller 60, and a third cable guide 67 (a first cable guide) which guides the second flat cables 41a and 41b are fitted to the controller 60. Note that the second flat cables 41a and 41b are flexible flat cables. As illustrated in FIG. 7, the rear surface side (REAR) of the image forming apparatus 10 is drawn to be on the front. The controller 60 is formed of the shield case 61, the controller circuit board 62 disposed inside the shield case 61, various electric wire bundles connected to the controller circuit board 62, guide members of the various electric wire bundles and the like. In the shield case 61, an opening at the rear surface side in the image forming apparatus 10 is shielded by a shield case lid (not shown) so that the shield case lid covers the controller circuit board 62.

The third cable guide 67 which is an example of a holding member is a guide member disposed in the shield case 61 for the second flat cables 41a and 41b which electrically connect a circuit board (another circuit board provided in the image forming apparatus 10) which controls the image scanner 40 and the controller circuit board 62. A top surface plate 80 is an exterior member which is a part of the image forming apparatus 10 and is disposed on a top surface of the frame body 70, between an image forming portion of the image forming unit and the image scanner 40. The top surface plate 80 which is a holding member regulates positions of the second flat cables 41a and 41b at a frame body 70 side. The second flat cables 41a and 41b which are connected to the circuit board (another circuit board provided in the image forming apparatus) of the image scanner 40 are guided by the top surface plate 80 and the third cable guide 67, and are connected to connectors 62b and 62c mounted on the controller circuit board 62. Note that in embodiment 2, a ferrite core which suppresses noise on signals which are transmitted by the second flat cables 41a and 41b may be included. The third cable guide 67 may be adapted to be provided with a concavity which regulates movement in the lateral direction of the ferrite core, and a claw for retention or the like to which the ferrite core is press-fitted. Here, in the second flat cables 41a and 41b, connecting portions at one end portions are connected to the connectors 62b and 62c, and connecting portions at the other end portions are connected to a connector on the circuit board which controls the image scanner 40, whereby the second flat cables 41a and 41b electrically connect the image scanner 40 and the controller circuit board 62. In the present embodiment, a position in which the connecting portions of the second flat cables 41a and 41b which are connected to the image scanner 40 are connected to the connectors 62b and 62c is set as a first position.

The second flat cables 41a and 41b on the third cable guide 67 are held by the third cable guide 67 so that lifts of the second flat cables 41a and 41b from the third cable guide 67 are regulated by cable regulating members 67a1, 67a2, 67a3 and 67a4. The third cable guide 67 is fixed to the shield case 61 by hook shapes 67c1, 67c2 and 67c3 and snap fits 67d1 and 67d2 (refer to FIG. 8). Here, the shield case 61 is formed from a metal, and the third cable guide 67 is formed from a resin. As illustrated in FIG. 7, in a state in which the second flat cables 41a and 41b are connected to the connectors 62b and 62c, the third cable guide 67 is interposed between the second flat cables 41a and 41b, and the shield case 61. Thereby, noise which occurs to the signals on the second flat cables 41a and 41b by the second flat cables 41a and 41b coming close to the shield case 61 formed from a metal can be reduced.

Figure 8:
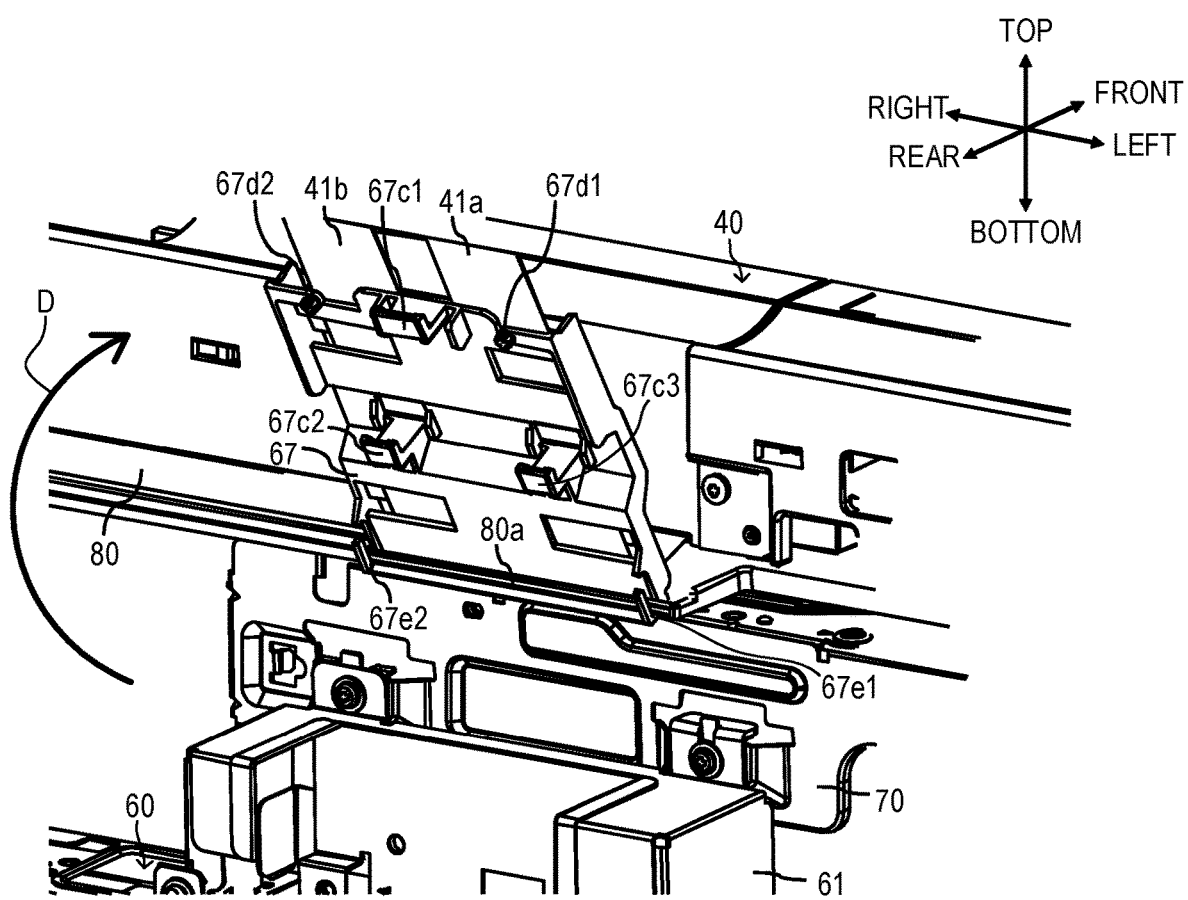
FIG. 8 is a perspective view illustrating a separating state of the cable guide in embodiment 2.
Figure 9A:
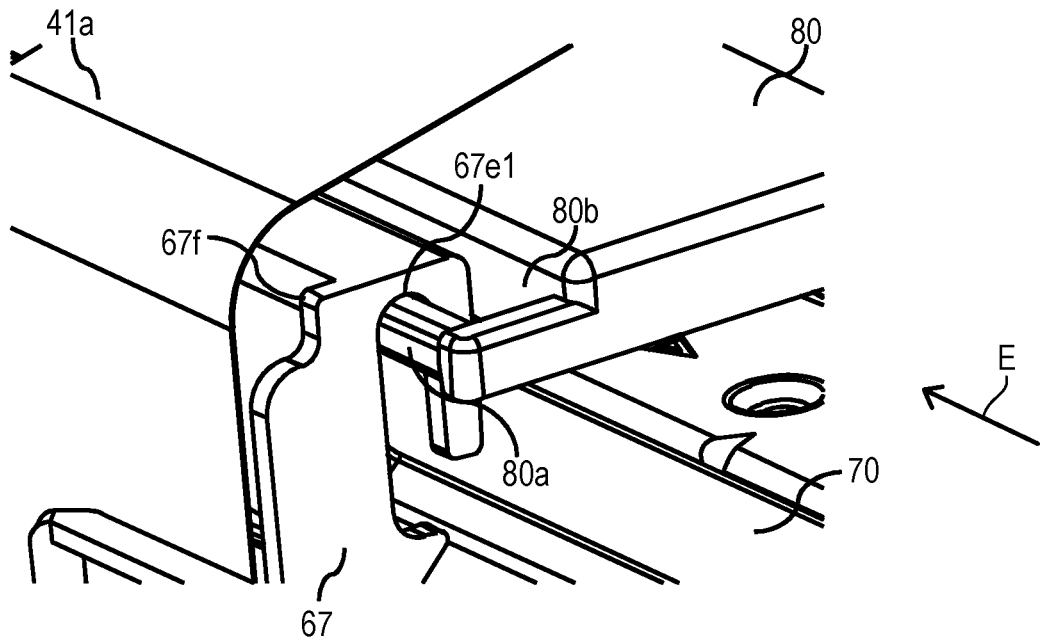
FIGS. 9A and 9B are detailed views illustrating a rotational portion of the cable guide in embodiment 2.
Figure 9B:
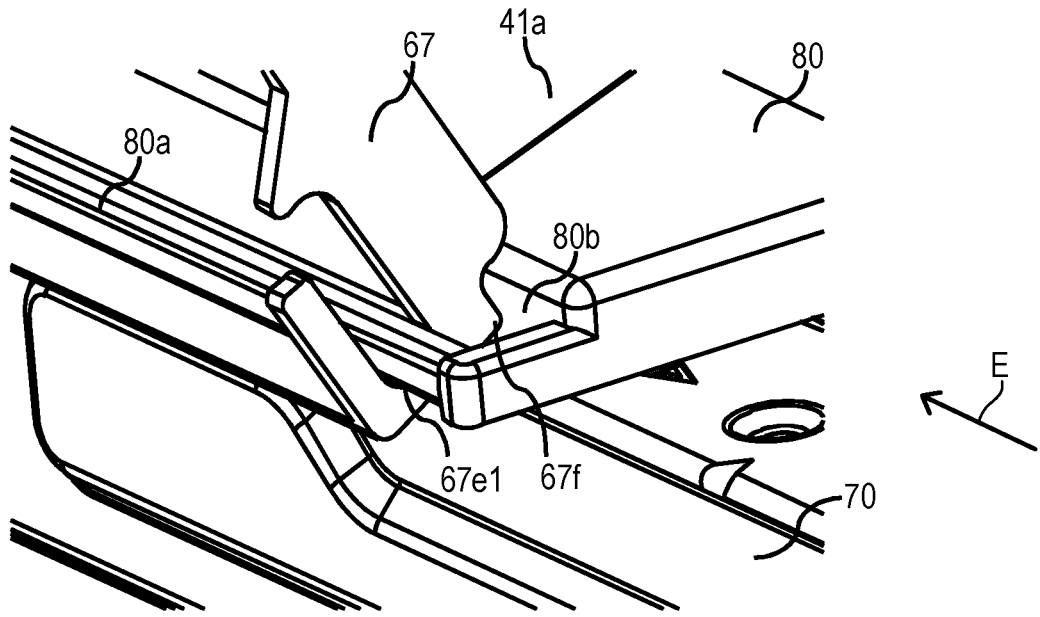
Figure 10A:
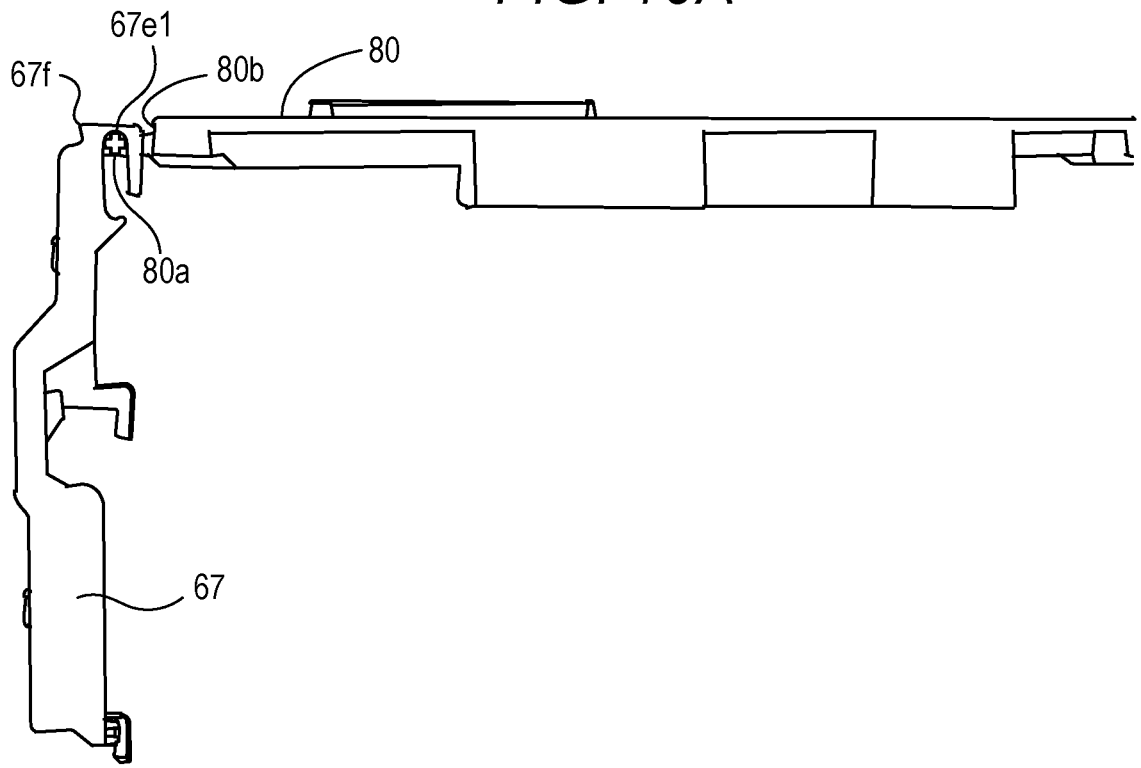
FIGS. 10A and 10B are side views illustrating the rotational portion of the cable guide in embodiment 2.
Figure 10B:
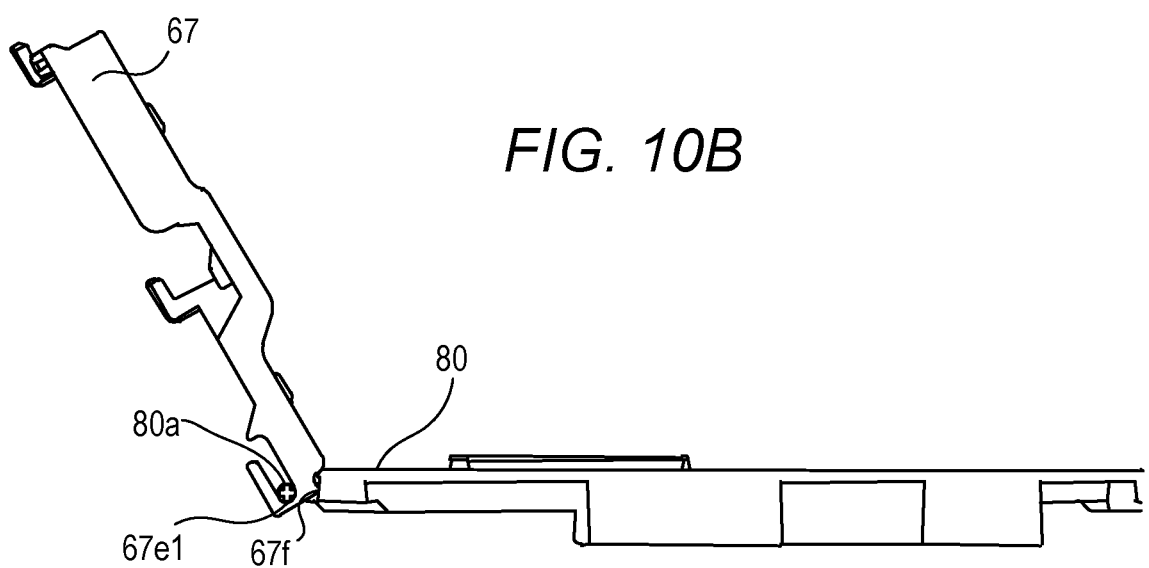

Next, a process of the third cable guide 67 rotating with respect to the frame body 70, and retracting from the controller 60 will be described with use of FIG. 8 and FIGS. 9A and 9B. FIG. 8 is a perspective view of a second state where the third cable guide 67 retracts from the controller 60, FIGS. 9A and 9B are detailed views of a rotational shaft portion, FIG. 9A illustrates a state where the third cable guide 67 is located in the first position, and FIG. 9B illustrates a state in which the third cable guide 67 is located in the second position. As illustrated by arrow D in FIG. 8, the third cable guide 67 rotates from the first position in FIG. 7 and moves to the second position in FIG. 8. Further, FIGS. 10A and 10B are views seen from arrow E directions in FIGS. 9A and 9B, and FIG. 10A corresponds to FIG. 9A, and FIG. 10B corresponds to FIG. 9B, respectively.

Second bearings 67e1 and 67e2 which are provided at the third cable guide 67 are rotatably held by a second shaft 80a provided at the top surface plate 80. The third cable guide 67 with the second flat cables 41a and 41b removed from the connectors 62b and 62c, and the snap fits 67d1 and 67d2 detached can rotate around the second bearings 67e1 and 67e2. The third cable guide 67 which is rotated reaches the second position illustrated in FIG. 8. At this time, the second flat cables 41a and 41b are in a state in which the second flat cables 41a and 41b are held by the third cable guide 67 and can retract from the controller 60 integrally with the third cable guide 67. Further, in the state in which the third cable guide 67 is located in the second position, the connecting portions of the second flat cables 41a and 41b, which are connected to the connectors 62b and 62c can be retracted from the fitting position of the controller 60 in the frame body 70. Further, the connecting portions which are connected to the connectors 62b and 62c in the second flat cables 41a and 41b can be retracted from the fitting position of the controller circuit board 62 in the frame body 70. In the present embodiment, a position in which the third cable guide retracts from the controller 60 in the state in which the connecting portions of the second flat cables 41a and 41b connected to the image scanner 40 are removed from the connectors 62b and 62c is set as the second position.

In the present embodiment, the constitution is adopted, in which the second bearings 67e1 and 67e2 are provided in the third cable guide 67 and the second shaft 80a is provided in the top surface plate 80, but a constitution may be adopted, in which the second shaft 80a is provided in the third cable guide 67, and the second bearings 67e1 and 67e2 are provided on the top surface plate 80.

The top surface plate 80 has an engaging portion 80b configured to hold an engaged portion 67f when the third cable guide 67 rotates with respect to the frame body 70 and the top surface plate 80 and moves from the first position to the second position. As illustrated in FIGS. 9A and 9B, the engaged portion 67f is provided at the third cable guide 67, and the engaging portion 80b is provided at the top surface plate 80, respectively. The top surface plate 80 is a plate portion which is provided at an image scanner 40 side (a reading device side) of the frame body 70, between the image scanner 40 and the image forming portion in the vertical direction (up-and-down direction). The engaged portion 67f is a protrusion provided at the third cable guide 67, and the engaging portion 80b is a recessed portion formed at the top surface plate 80 (plate portion). When the third cable guide 67 moves from the first state to the second state, the protrusion of the third cable guide 67 is press-fitted to the recessed portion of the top surface plate 80, and thereby the third cable guide 67 is held in the state in which the third cable guide 67 is located in the second position. When the third cable guide 67 moves from the first position (FIG. 9A) to the second position (FIG. 9B), the engaged portion 67f abuts on the engaging portion 80b in a lightly press-fitted state. At this time, in order that the third cable guide 67 returns to the first position from the second position, it is necessary to release the lightly press-fitted state of the engaged portion 67f to the engaging portion 80b, so that the third cable guide 67 can be held in the second state as long as an operation is not performed intentionally. That is, even when the worker moves his or her hands from the third cable guide 67 when attaching the controller 60, the state where the third cable guide 67 is retracted from the fitting position of the controller 60 as illustrated in FIG. 8 is kept.

Figure 11:
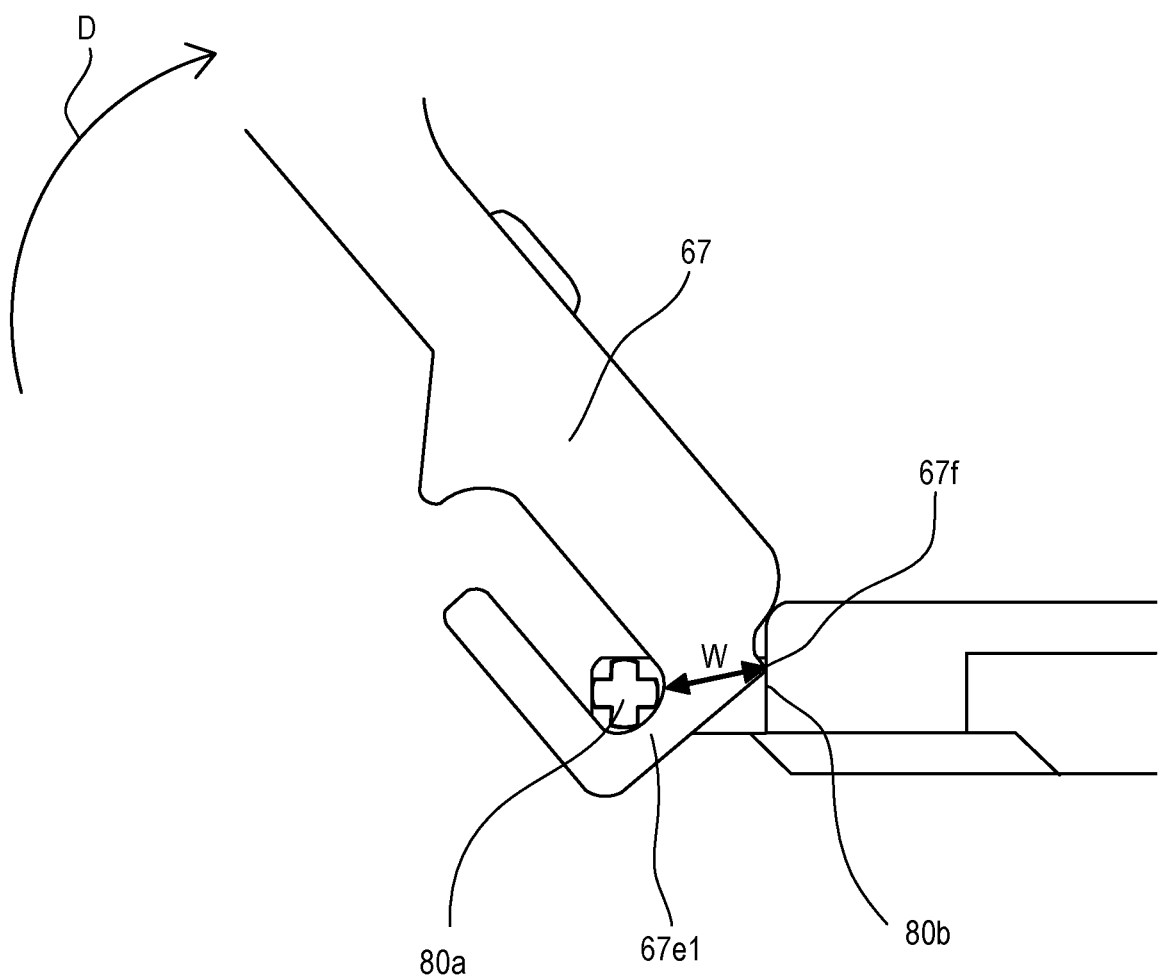
FIG. 11 is an enlarged view illustrating the rotational portion of the cable guide in embodiment 2.

More detailed explanation will be made with use of FIG. 11. When the third cable guide 67 is rotated upward (an arrow D direction) with respect to the frame body 70, the engaged portion 67f of the third cable guide 67 collides with the engaging portion 80b. In that case, the third cable guide 67 is brought into a state where the third cable guide 67 cannot rotate upward (the arrow D direction) any more. With this, a portion of W of the third cable guide 67 illustrated in FIG. 11 is in a state in which the portion of W is fitted in between the second shaft 80a and the engaged portion 67f. Therefore, even when the worker moves his or her hands from the third cable guide 67, the state is kept, in which the third cable guide 67 is raised upward as illustrated in FIG. 10B.

As above, in embodiment 2, the constitution is adopted, in which the third cable guide 67 is rotatably held by the top surface plate 80 provided at the frame body 70 (housing), and the second flat cables 41a and 41b are held on the third cable guide 67. Thereby, the worker does not have to attach the controller 60 while having the flat cable in his or her hand, so that workability of the worker can be restrained from being reduced. Further, the second flat cables 41a and 41b which are removed when the controller 60 is detached can be prevented from bending by a self-weight of the third cable guide 67 and damaging the signal line. Further, by keeping the third cable guide 67 in the second state, a damage caused by unintentionally catching the third cable guide 67 and the second flat cables 41a and 41b can be prevented when the controller 60 is attached. Further, a similar effect can be also expected in a constitution in which the controller circuit board 62 is disposed on the rear surface of the image forming apparatus 10 without providing the shield case 61. For example, when the controller circuit board 62 is attached to the image forming apparatus 10, the first flat cable 64 can be retracted from the fitting position of the controller circuit board 62 according to the constitution of embodiment 1. Consequently, a damage (flaw/breaking wire) of the second flat cables 41a and 41b can be prevented, which is caused by the connecting portions of the second flat cables 41a and 41b being caught by the controller circuit board 62 and the frame body 70.

The tandem type color electrophotography image forming apparatus is also described in embodiment 2, but the constitution of embodiment 2 is also applicable to image forming apparatuses of other types such as an electrophotography type and an inkjet type, than the tandem type. As above, according to embodiment 2, the flat cables can be prevented from being damaged without reducing workability at the time of assembly and at the time of maintenance work.

Further, in embodiment 2, a constitution in which the ferrite core which is a noise suppressing member is provided is not shown, but a constitution may be adopted, in which a ferrite core through which the respective second flat cables 41a and 41b are inserted is provided in the third cable guide 67 as in embodiment 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133802, filed Jul. 7, 2017, which is hereby incorporated by reference herein in its entirety.

What is claimed is:

1. An image forming apparatus, comprising:
a circuit board on which an electronic part and a connector are mounted;
a housing to which the circuit board is attached;
a flexible flat cable having a connecting portion, which is connectable to the connector, and configured to electrically connect the circuit board and another circuit board different from the circuit board provided in the image forming apparatus; and
a holding member holding the flexible flat cable and configured to be rotatable integrally with the flexible flat cable with respect to the housing,
wherein the holding member is held rotatably with respect to the housing so that the holding member is rotatable between a first position in which the connecting portion is connected to the connector and a second position in which the connecting portion is retracted from a fitting position of the circuit board in the housing in a state in which the connecting portion is removed from the connector.

2. The image forming apparatus according to claim 1, wherein the circuit board is located at a rear surface side of the image forming apparatus.

3. The image forming apparatus according to claim 1, further comprising a noise suppressing member configured to suppress noise on a signal which is transmitted by the flexible flat cable,
wherein the holding member has a holding portion configured to hold the noise suppressing member.

4. The image forming apparatus according to claim 1, further comprising a support member provided at the housing and configured to support the holding member rotatably with respect to the housing,
wherein the holding member has an engaged portion, and
wherein the support member has an engaging portion which engages with the engaged portion to hold the holding member in the second position when the holding member rotates with respect to the support member to rotate from the first position to the second position.

5. The image forming apparatus according to claim 4, wherein the support member holds the flexible flat cable together with the holding member.

6. The image forming apparatus according to claim 5, wherein the holding member is formed to be long in a direction in which a signal line of the flexible flat cable extends,
wherein the engaged portion is provided at an end portion on a side opposite to the connecting portion in a longitudinal direction of the holding member,
wherein the engaging portion is a protrusion formed on the support member, and
wherein when the holding member rotates from the first position to the second position, the engaged portion abuts on the protrusion and then climbs over the protrusion so that the holding member is held in the second position.

7. The image forming apparatus according to claim 1, further comprising a shield case containing the circuit board and configured to be attachable to and detachable from the housing,
wherein the holding member is fixed to the shield case in a state in which the holding member is located in the first position, and the holding member is retracted from a fitting position of the shield case in the housing in a state in which the holding member is located in the second position.

8. The image forming apparatus according to claim 7, wherein the holding member is provided at a position in which at least a part of the holding member overlaps the shield case in a front-rear direction of the image forming apparatus in the state in which the holding member is located in the first position.

9. The image forming apparatus according to claim 1, further comprising:
- a photosensitive member;
- an exposure device configured to form a latent image on the photosensitive member; and
- a controller having the circuit board and configured to control the image forming apparatus,
- wherein the flexible flat cable is a signal line connecting the controller and the exposure device.

10. The image forming apparatus according to claim 1, further comprising:
- a reading device configured to read an image of an original;
- an image forming portion configured to perform an image formation based on the image of the original read by the reading device; and
- a controller having the circuit board and configured to control the image forming apparatus,
- wherein the flexible flat cable is a signal line connecting the controller and the reading device.

* * * * *